E. KAYE.
BUILDING BLOCK OR BRICK.
APPLICATION FILED JUNE 5, 1908.
915,608.
Patented Mar. 16, 1909.
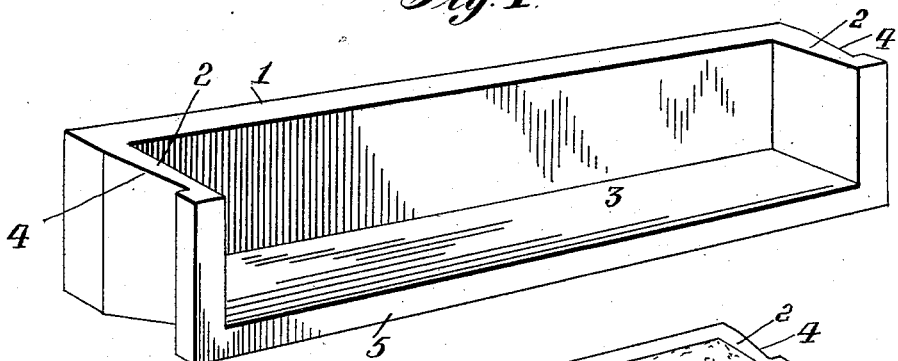
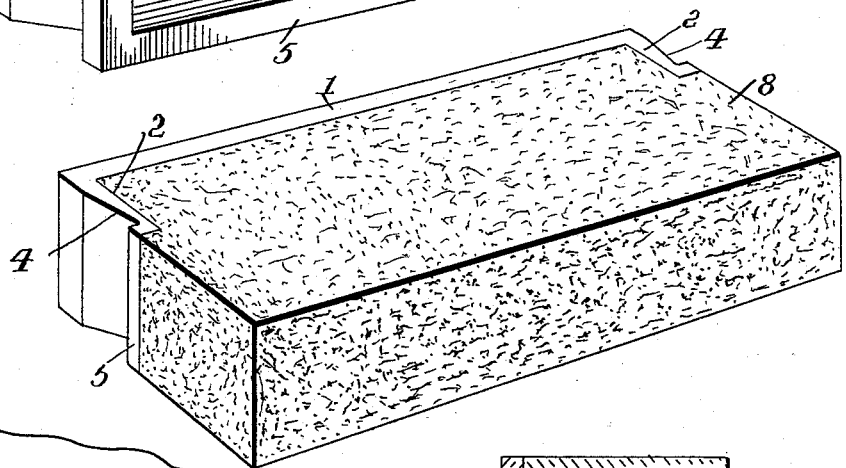
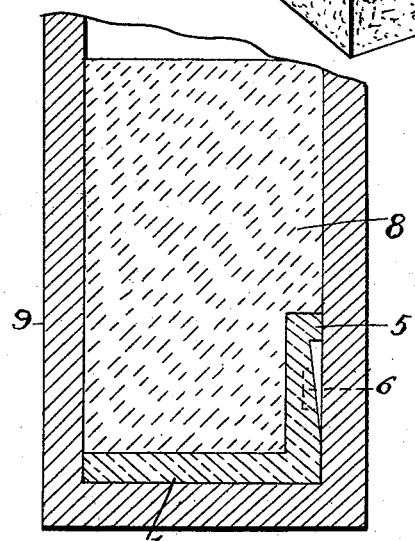
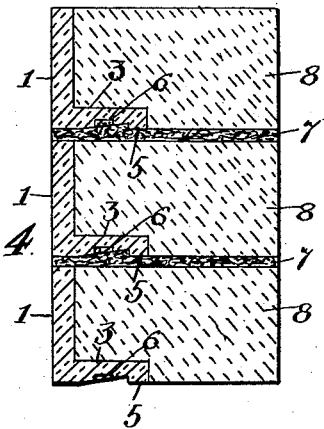
Witnesses
J. G. Campbell
J. P. Himes
Inventor
Edward Kaye
By Connolly Bros.
Attorneys

UNITED STATES PATENT OFFICE.

EDWARD KAYE, OF MONACA, PENNSYLVANIA.

BUILDING BLOCK OR BRICK.

No. 915,608.

Specification of Letters Patent.

Patented March 16, 1909.

Application filed June 5, 1908. Serial No. 436,940.

*To all whom it may concern:*

Be it known that I, EDWARD KAYE, a citizen of the United States, residing at Monaca, in the county of Beaver and State of Pennsylvania, have invented certain new and useful Improvements in Building Blocks or Bricks, of which the following is a specification.

This invention has relation to building blocks and relates in particular to building blocks having glass faces in imitation of enameled, vitrified or glazed bricks.

My invention consists in the novel construction, combination and arrangement of parts hereinafter described and claimed and in carrying my invention into effect I press a glass facing having a front, a bottom and two ends and preferably form the balance of the building block of suitable cement, concrete, plaster or other plastic material which I press, tamp, squeeze or otherwise form to the required size and shape, partly within the space bounded by the bottom and the ends of the glass facing and extending adjacent to such facing a sufficient distance in each direction to form with such facing a building block of the required size and shape and then allow the plastic material to set or dry so as to assume a hard and solid condition.

Details of form, material and process of manufacture will be given hereinafter, reference being had to the accompanying drawing illustrating my invention wherein:

Figure 1 is a perspective view of the glass facing before the addition thereto of the cement or similar filling and backing or body. Fig. 2 is a perspective view of the completed block. Fig. 3 is a vertical transverse sectional view of a mold for forming the plastic backing or body in and on the facing, the facing and body or backing being shown in the mold. Fig. 4 is a vertical transverse sectional view of a portion of a wall composed of my improved building blocks.

The facing, which is composed of glass or other similar vitreous material, is either transparent opaque or translucent and of any suitable or desired color, and is composed of the front 1, the two ends 2, and the bottom 3, being open on top and at the rear as shown. A groove 4 is formed in the facing, this groove extending parallel to the front 1, along the bottom and both ends, and leaving a flange 5, the groove and flange serving in connection with the mortar or cement ordinarily used, to bind or secure the building blocks, and particularly the facing thereof, in position in the wall or other part of a structure in which they are laid. The cross sectional form of groove 4 is preferably triangular, as this form provides a vertical surface on flange 5 at a right angle to the flat horizontal surface and affords a good holding surface for the cement or mortar in which the building blocks are laid.

Indentations or recesses 6 are formed in the bottom 3 of the facing, which may extend part way or entirely through the bottom, and serve to afford additional holding points for the cement or mortar, as may be seen by an inspection of Fig. 4 in which the cement or mortar in which the building blocks are laid is designated 7 and entirely fills the grooves 4 and the recesses 6.

The facings 1 are formed in a suitably constructed mold by means of a glass press in the ordinary and well known manner such as is commonly followed in pressing other glass articles and which need not therefore be described, and are annealed as is usual in the manufacture of other articles of glass.

The completion of the bricks with their glass facing and cement or other primarily plastic backing is preferably and readily accomplished by placing the facing in a mold 9, of suitable size and form, as shown in Fig. 3, and then filling in the mold to the requisite height with the plastic material which is pressed, tamped, squeezed or otherwise treated to render it sufficiently compact and the completed block being, if necessary, allowed to set and dry to sufficient extent to render it easy to handle, is removed from the mold and may be artificially dried and tempered or otherwise treated in the manner and by the means usually employed in the manufacture of cement or concrete building blocks of the ordinary character.

It will be observed that when the bricks or blocks are laid on their sides as in Fig. 4, the molded plastic filling and backing is equal in thickness, that is in vertical extent, to the height or distance from the upper to the lower edge of the vitreous facing. Thus the backing is flush with the upper and lower edges of the facing and by reason of this fact the pressure to which the blocks or bricks are subjected will be sustained wholly or in greater part by the backing, thus relieving the facing of pressure and avoiding fracture of the facing by weight or crushing strain.

I claim:

1. A building block composed of a vitreous facing, comprising front and end walls and a bottom, the facing being open on top said facing being formed with a groove adjacent to and parallel with one side and extending parallel with both edges of the front in combination with a filling and backing composed of plastic material molded into and in the rear of said facing and self adherent thereto.

2. A building block composed of a vitreous facing comprising front and end walls and a bottom, the facing being open on top in combination with a primarily plastic filling molded into and extending rearwardly from the facing beyond the end walls and bottom and dried in position therein.

3. A building block comprising a vitreous facing having a bottom and end walls and open on top and a molded plastic backing extending between the end walls and in the rear thereof.

In testimony whereof I affix my signature, in presence of two witnesses.

EDWARD KAYE.

Witnesses:
HARRY C. FRY, Jr.,
JOHN MOULD.